US010395154B2

(12) United States Patent
Beacham

(10) Patent No.: US 10,395,154 B2
(45) Date of Patent: Aug. 27, 2019

(54) DIGITAL LABEL AND ASSET TRACKING INTERFACE

(71) Applicant: General Electric Company, Schenectady, NY (US)

(72) Inventor: Jimmie Autrey Beacham, Waukesha, WI (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 15/339,371

(22) Filed: Oct. 31, 2016

(65) Prior Publication Data

US 2018/0121774 A1    May 3, 2018

(51) Int. Cl.
| | | |
|---|---|---|
| G06K 19/06 | (2006.01) |
| G09G 5/00 | (2006.01) |
| G09G 5/36 | (2006.01) |
| G09F 3/20 | (2006.01) |

(52) U.S. Cl.
CPC ....... *G06K 19/06009* (2013.01); *G09F 3/204* (2013.01); *G09F 3/208* (2013.01); *G09G 5/003* (2013.01); *G09G 5/363* (2013.01); *G09G 2380/02* (2013.01); *G09G 2380/04* (2013.01)

(58) Field of Classification Search
CPC ........ G06K 19/06; G06K 19/00; G06K 15/00; G06F 17/00
USPC .......................... 235/494, 375, 487, 383, 492
See application file for complete search history.

(56) References Cited

U.S. PATENT DOCUMENTS

| | | | |
|---|---|---|---|
| 2001/0020935 A1 | 9/2001 | Gelbman | |
| 2002/0167500 A1* | 11/2002 | Gelbman | G06F 3/14 345/204 |
| 2005/0149226 A1* | 7/2005 | Stevens | B65G 1/1371 700/214 |

(Continued)

FOREIGN PATENT DOCUMENTS

| | | |
|---|---|---|
| EP | 0 680 012 A2 | 11/1995 |
| EP | 1 736 951 A2 | 12/2006 |
| EP | 2 833 343 A2 | 2/2015 |

OTHER PUBLICATIONS

International Search Report and Written Opinion issued in connection with corresponding PCT Application No. PCT/US2017/059181 dated Feb. 23, 2018.

*Primary Examiner* — Edwyn Labaze
(74) *Attorney, Agent, or Firm* — Christopher R. Carroll; The Small Patent Law Group LLC

(57) ABSTRACT

In the present invention, a digital and programmable information presentation device or label is formed with a display that is operably connected to a controller that can operate the display to present information stored in an electronic memory unit connected to the controller. The information relating to the product is uploaded and stored in the memory unit according to the requirements for the information to be presented on the device/label. Further, as the device can includes a wireless communication transceiver connected to the controller, changes to the information presented on the display can be made remotely to address issues with regard to the product information stored within the device. Also included in the information would be environmental sensing that would start logging data from the time the product is made, during shipping/handling of the product and throughout the intended useful life of the product.

19 Claims, 3 Drawing Sheets

(56) References Cited

U.S. PATENT DOCUMENTS

| | | | | |
|---|---|---|---|---|
| 2006/0143645 A1* | 6/2006 | Vock | ................... | A43B 3/00 |
| | | | | 725/9 |
| 2006/0238309 A1* | 10/2006 | Takatama | ........... | G06K 19/0723 |
| | | | | 340/10.41 |
| 2007/0051816 A1* | 3/2007 | Chu | ................... | G06F 3/147 |
| | | | | 235/492 |
| 2008/0067253 A1* | 3/2008 | Erickson | .............. | G06K 17/00 |
| | | | | 235/487 |
| 2009/0309736 A1* | 12/2009 | Heurtier | .............. | G06K 19/041 |
| | | | | 340/572.8 |
| 2011/0122120 A1* | 5/2011 | Feuilloley | ............. | G06K 19/04 |
| | | | | 345/211 |
| 2012/0000974 A1* | 1/2012 | Hung | ................. | G06F 3/147 |
| | | | | 235/375 |
| 2015/0035674 A1* | 2/2015 | Karhuketo | ........... | G06K 19/027 |
| | | | | 340/572.8 |
| 2015/0154489 A1* | 6/2015 | Dancausse | ....... | G06K 19/07758 |
| | | | | 235/488 |
| 2015/0302349 A1* | 10/2015 | Atkinson | ......... | G06K 19/06028 |
| | | | | 705/333 |
| 2017/0178034 A1* | 6/2017 | Skeen | .............. | G06F 17/30389 |

\* cited by examiner

DIGITAL LABEL AND ASSET TRACKING INTERFACE

BACKGROUND OF INVENTION

The subject matter disclosed herein relates generally to labels and more particularly to labels applied to machinery to provide identification of the machinery and the components parts thereof.

There is an ever increasing demand for product labeling for both domestic and international trade driven by each country's individual regulatory body. These country-specific regulations produce significant complexity in the product label design and supply chain management, especially for producers of heavily regulated products like medical devices, as well as in the aviation and nuclear industries.

For companies that ship products globally, these requirements are met using country-specific labels applied to the exterior or body of the product to provide identifying information about the product as determined by the requirements or regulations of the country to which the product is to be shipped. These labels not only require the information about the product but often must be printed in the local language of the country into which the products are to be shipped. Further, the labels often have to include information not only about the end product itself, but about various component parts utilized in the assembly of the product, such as X-ray tubes in diagnostic imaging machines. For example, under the FDAs Unique Device Identification rules, all labels for certain medical devices include information that is standardized to relate serial numbers of the components of the devices to the serial number of the overall device including those components, which can be accessed via a Global UDI Database in which information on the device having the UDI is stored.

To address these labeling requirements, the manufacturing plant from which the finished product originates has to store and maintain hundreds of kinds of labels corresponding to the different countries to which the product(s) are to be shipped. So when a finished product is produced, the destination country of the product is identified in a late point configuration where country specific software is loaded onto the product and the appropriate country-specific labels are attached to the product.

One significant drawback with regard to this labeling process is that the labels themselves are conventional adhesive-backed paper labels. The adhesive backing on these labels has a shelf life that limits the length of time the adhesive can reliably adhere to the surface of the product in order to present the required information on the label to the purchaser. Also, the nature of the paper forming the printed surface of the label also limits the ability of the labels to endure certain conditions that can degrade the integrity of the label and/or legibility of the information printed on the label. For example, should the label become wet and/or be frictionally contacted by or rubbed against another surface, the printed information on the label can easily become illegible and/or separated from the remainder of the label remaining on the product, rendering the label completely ineffective for its express purpose. Further, with regard to the amount of information that is to be provided via the label, the size of the machine presents a limiting factor with regard to the size of the label, and thus the amount of information that can be presented on the label.

In addition, separately from the issues concerning the structure of the labels, the printing of the proper country-specific information on the labels can be a very mistake prone operation. If incorrect information is printed on a label, the correction of the label can cause a great deal of reworking to correct or provide a substitute for the label. Additionally, if the incorrect label is applied to a product that is subsequently shipped, field engineers often must track down the product in the field to make the label correction. This also can occur even if the information is correct initially, but a replacement part for the product is installed, thereby requiring the information on the label to be updated.

Therefore, to address these issues it is highly desirable to develop a labeling system, device and method of use that more easily allows for required labeling information to be applied to a product and to be corrected on the product if a mistake or update of the information on the label is required.

BRIEF DESCRIPTION OF THE INVENTION

The above-mentioned drawbacks and needs are addressed by the embodiments described herein in the following description. In the various embodiments of the invention, a digital and programmable information presentation device or label is formed with a display that is operably connected to a controller that can operate the display to present information stored in an electronic memory unit connected to the controller. The information relating to the product is uploaded and stored in the memory unit according to the requirements for the information to be presented on the device/label. The controller accesses this information and operates the display to present the information on the label in the appropriate manner. Further, as the device can includes a wireless communication transceiver connected to the controller, changes to the information presented on the display can be made remotely to address issues with regard to the product information stored within the device.

This device simplifies and digitizes the presentation of information presented on prior art product labels that only satisfy regulatory requirements and in addition is able to track all of the information relating to the internal components of the product on which the device or label is placed. This information would include serialization, regulatory marking status, revision control, unique identification requirements, field replaceable unit tracking and product location information. Also included in the information would be environmental sensing that would start logging data from the time the product is made, during shipping/handling of the product and throughout the intended useful life of the product. The device can additionally serve as cost effective hub for remote communication to products for engineering data on usage of the product, performance of the product, predictive maintenance and service surveillance.

One exemplary embodiment of the invention is a product information display device for application to a product, the product information display device including a controller, a non-transitory electronic memory unit operably connected to the controller and configured to store product information therein, a securing mechanism configured to secure the device to a surface of the product and a display operably connected to the controller and configured to present the product information thereon.

Another exemplary embodiment of the invention is method for presenting information about a product on the product including the steps of securing a product information display device to the product, the product information display device including a controller, a non-transitory electronic memory unit operably connected to the controller and configured to store product information therein and a display operably connected to the controller and configured to present the product information thereon, obtaining product information; and presenting the product information on the display.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description.

Furthermore, the claimed subject matter is not limited to implementations that solve any disadvantages noted above or in any part of this disclosure

BRIEF DESCRIPTION OF THE DRAWINGS

The drawings illustrate the best mode presently contemplated of carrying out the disclosure. In the drawings.

DETAILED DESCRIPTION OF THE DRAWINGS

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Exemplary embodiments of the invention relate to a product information display device that is applied to the exterior of a product, such as a medical device. The product information display device or label includes a digital display connected to a controller that operates the display to present information about the product that is stored in an electronic storage unit operably connected to the controller.

Figure 1:
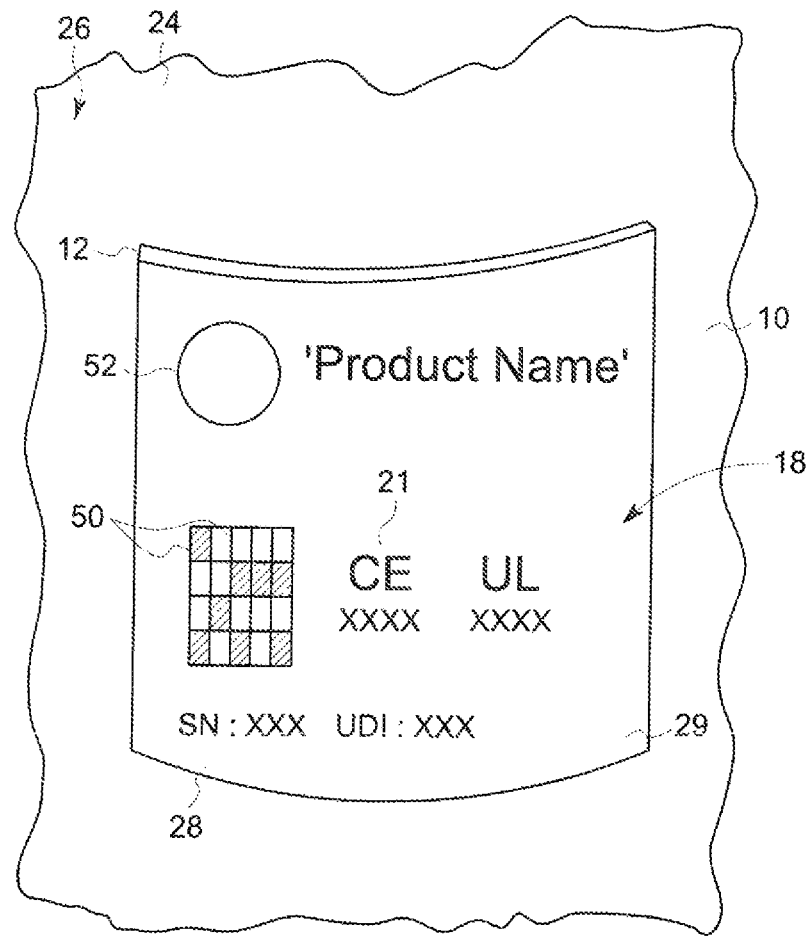
FIG. 1 is an isometric view of an product information display device or label according to an exemplary embodiment of the invention.

In the exemplary and non-limiting embodiment illustrated in FIG. 1, the product information display device or label is indicated generally at 10. The label 10 includes a panel or substrate 12 formed of a suitable flexible material, such as a suitable plastic material, for example, and that includes a front surface 14 and a rear surface 16. The panel 12 includes a display 18 disposed on the front surface 14 and a securing mechanism 20 disposed on the rear surface 16. The securing mechanism 20 can be formed of any suitable mechanism, such as a mechanical or magnetic securing mechanism that can releasably or fixedly secure the panel 12 to the surface 24 of the product 26, but in one exemplary and non-limiting embodiment the mechanism 22 takes the form of an adhesive layer 22 applied to one or more portions or the entirety of the rear surface 16. The adhesive layer 22 can be formed with any conventional adhesive capable of securely adhering the material forming the panel 12 to an exterior surface 24 of the product 26, whether the surface 24 be formed of plastic, metal or other materials.

Opposite the securing mechanism 22, the panel 12 includes the display 18. In the illustrated exemplary and non-limiting embodiment of FIG. 1 the display 18 is attached to the panel 12 in a suitable manner, or alternatively can be formed as a part of the panel 12 in other exemplary and non-limiting embodiments. The display 18 is capable of presenting various information thereon, and can use the entire area of the display 18 for presenting the information, or can optionally be separated into various segments 27-29 with each segment 27-29 displaying separate information thereon. The display 18 is configured to enable digital signals representing the information to be presented on the display 18 to be received by the display 18 and for the display 18 to correspondingly active at the required areas in order to present the information represented by the signals on the display 18. Thus, the display 18 can have any of a number of suitable constructions, but in the illustrated exemplary and non-limiting embodiment of FIG. 1 the display 18 is formed as an organic light-emitting (OLED) having a suitable construction that can readily conform in shape to the flexing of the underlying panel 12.

Figure 2:
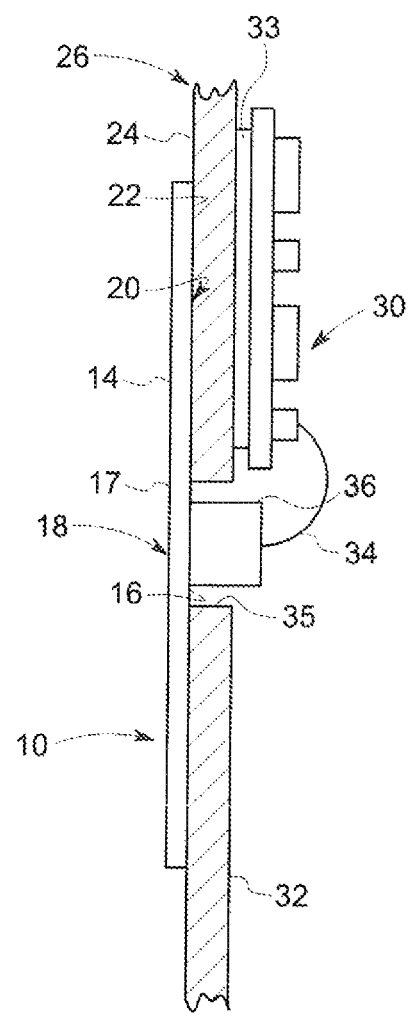
FIG. 2 is a cross-section view of the product information display device according to an exemplary embodiment of the invention.

The display 18 is connected on the panel 12 to a communication command center or controller 30. The controller 30 selectively operates the display 18 by sending digital signals to the display 18 corresponding to the information to be presented on the display 18. In the exemplary and non-limiting embodiment for FIG. 2, the controller 30 is disposed on the product 26, such as on an interior surface 31 of the product 26 using an adhesive layer 33. The controller 30 includes a cable 34 secured to the controller 30 at one end and extending through an aperture 35 in the product 26 to be connected to the display 18 at the opposite end. The cable 34 can engaged with a connector 36 located on the panel 12 and connected to the display 18, as shown in FIG. 2. Alternatively, the controller 30 can be disposed on the exterior surface 24 of the product 26 for connection to the display 18 via the cable 34, or can be incorporated within the panel 12 as a part of the label 10.

Figure 3:
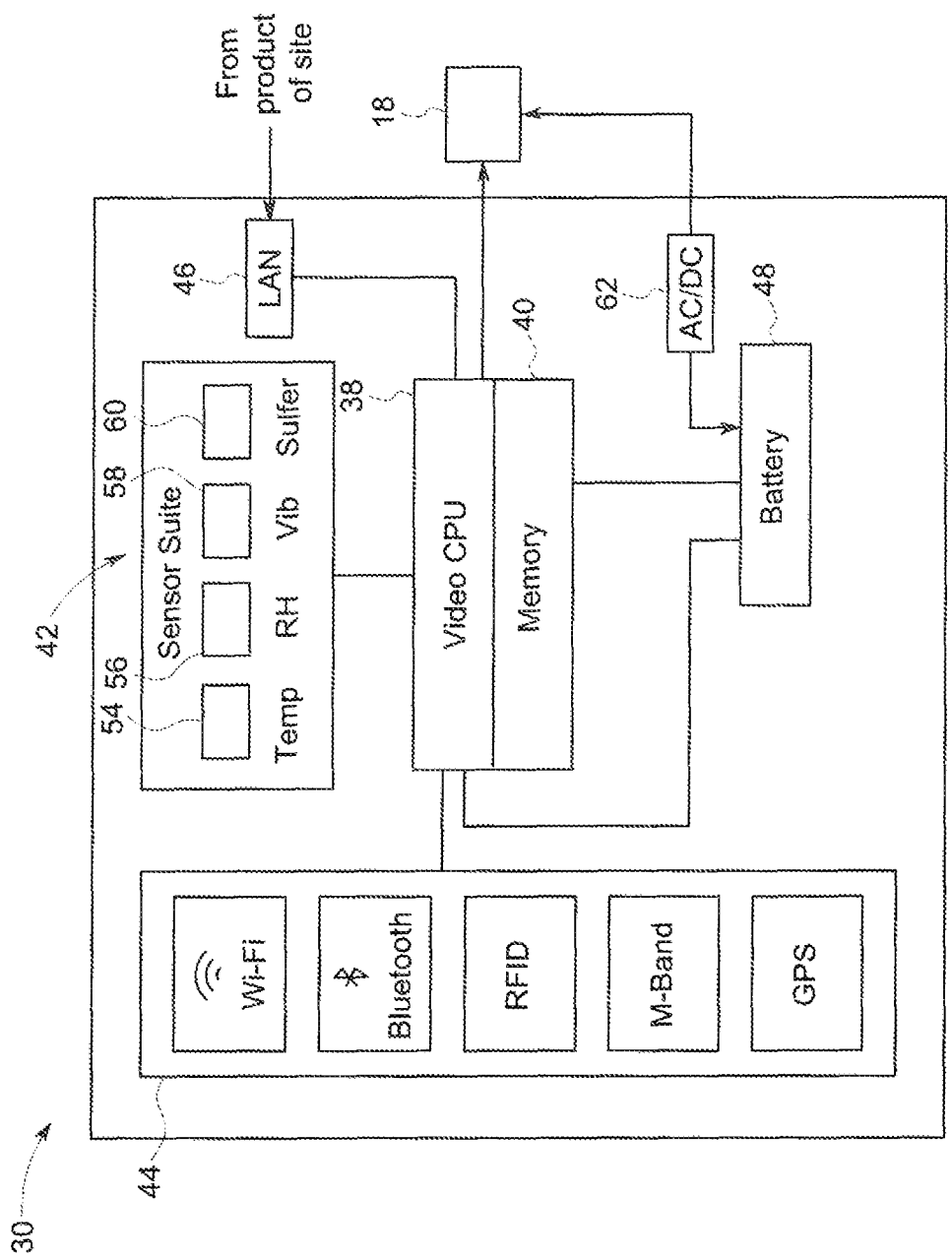
FIG. 3 is a schematic view of the product information display device according to an exemplary embodiment of the invention.

With reference now to the exemplary and non-limiting embodiment illustrated in FIG. 3, the controller 30 includes a central processing unit (CPU) 38 that is operably connected to an electronic memory unit 40, such as a non-transitory electronic memory unit, a sensor suite 42, a transceiver 44, and a local area network connection 46, as well as to a power supply or battery 48. The CPU 38 communicates with the display 18 by sending appropriate signals to the display 18 to cause the display 18 to present the information represented by the signals on the display 18.

The information concerning the product stored in the memory unit 40 can be preprogrammed into the unit 40, or can be uploaded into the memory unit 40 using the cable 34 or the transceiver 44. The information stored/retained within the memory unit 40 relates to the unique identifying information required to be present on a conventional label applied to the exterior of the product 26, including, but not limited to, the serial number for the product 26, any other unique identifying number, such as the UDI number, for the product 26, QC code(s) and/or any testing and/or safety certifications applicable to the product 26. In addition, the information stored in memory unit 40 can include the manufacturer name and product name, as well as the language in which the relevant information is to be displayed. This information is accessed by the CPU 38 and transmitted to the display 18 via the cable 34 in order for the display 18 to selectively activate pixels 50 on the display 18 in order to present the information provided by the signals from the CPU 38 on the display 18.

In addition to the information provided by the signals from the CPU 38, depending upon the nature of the material forming the display 18 and or panel 12, printed indicia 32 representing standard information regarding the product 26 can be placed on the display 18 and/or front surface 14 of the panel 12. This indicia 52 is disposed on the front surface 14 or display 18 in a location or locations away from those areas in which the display 18 will present information from the memory unit 40 so as not to obscure the information stored in the memory unit 40.

In the exemplary and non-limiting embodiment of FIG. 3, the CPU 38 is additionally connected to a sensor suite 42. The sensor suite 42 includes one or more sensors 54-60 that are capable of sensing various environmental parameters for the product 26. The suite 42 can includes temperature sensor 54, a humidity sensor 56, a vibration sensor 58 and an air quality and/or sulfur dioxide sensor 60, among other sensors and in any combination. Theses sensors 54-60 collect and provide data to the CPOU 38 concerning the various environmental parameters surrounding the product 26 during shipment and/or end use which can be stored in the memory unit 40 for later retrieval and analysis. In addition, the data from the sensor suite 42 can be selectively presented on the display 18 when the CPU 38 is queried to do so.

The controller 30 may additionally include a transceiver 44 that is capable of transmitting and receiving wireless signals in one or more different protocols, such as WiFi, Bluetooth®, RFID, M-band or GPS protocols. The transceiver 44 enables the controller 30 to communicate with various wireless devices, including but not limited to, other components of the product 26, smart phones, other products, local WiFi connections and satellite location (GPS) services. Also, the controller 30 includes a LAN connection 46 enabling the controller 30 to wirelessly communicate with the product 26 and other devices 10 and/or products 26 within the LAN to disseminate information therebetween.

The power source or battery 48 is operably connected to the various components of the controller 30 to supply power thereto, and can be formed of a replaceable battery, or a rechargeable power supply 48 that can be recharged in any suitable manner, such as by a wired, e.g., via the cable 34, or wireless, e.g., inductive, connection to another power supply. Further, through the connection of the controller 30 to the display 18, the power source 48 can be utilized to supply power for the operation of the display 18, such as through a power converter 62 connected between the power supply 48 and the display 18.

In operation, information relating to the product 26 is uploaded to the memory unit 40 of the controller 30 using a wired or wireless data connection. With the digital and programmable label or device 10, the product information and intended country of sale, i.e., language and types of information to be presented on the display 18, can be loaded either at the site of manufacturing or remotely, if necessary. This significantly reduces the manual paper work of getting all the component serial numbers, revision numbers and regulatory labels tied to the overall product label as a result of the electronic files or information that can be transmitted to the device 10 and controller 30 using the transceiver 44 having the RFID, Bluetooth, M-Band, etc. connectivity.

Once loaded into the memory unit 40, the controller 30 can be placed on the product 26 and wired or wirelessly connected to the display 18, unless the controller 30 is integrated into the panel 12 supporting the display 18 where the controller 30 is already connected to the display 18, forming an integral device 10. The CPU 38 can then access the information within the memory unit 40 and transmit the information for presentation on the display 18. The display 18 can be operated in any suitable manner by the CPU 38, such as by operating the display 18 when the display 18 or a suitable contact point/switch (not shown) on the device 10 is activated, or by operating the display 18 for set time intervals, or by maintaining the display 18 operational at all times, among other suitable operational schemes.

After the device 10 is placed on the product 26 and/or activated, the device 10 also activates the sensor suite 42. The individual sensors 54-60 continuously obtain information on the selected environmental conditions surrounding the product 26 and can store the sensor information within the memory unit 40 and/or can transmit the information utilizing the transceiver 44 to a remote location. The sensor information provided by the sensor suite 42 can provide valuable data on the health of the equipment/product 26 in the field by monitoring temperature, noise/vibration, humidity, and sulfur dioxide levels in the air, among other parameters, both during transit/shipment of the product 26 (to remotely monitor the status of the product 26 prior to delivery) and during use of the product 26 at the destination (to remotely monitor the status of the product 26 as it is utilized after delivery). For example, the controller 30/sensor suite 42 can provide an alert via the transceiver 44 when something abnormal occurs during shipping and handling of the product 26 as sensed by the noise/vibration sensor 58. As a result of the alert, the product 26 can be diverted and a better handled product 26 can be delivered to the customer, with the objective data from the noise/vibration sensor 58 able to be provided to the logistics provider for any insurance coverage.

In addition, during shipment, the GPS capability of the device 10 enables the ability to either track the product 26 via GPS or from a local signal (LAN connection 46) that can connect to a smart phone. The device 10 can provide vital tracking information to determine where a product 26 is located in transit, in order to give the customer an exact date of delivery. This information can also be utilized for product tracking not only during initial shipment of the product 26 but also in situations where the initial customer sells the product 26 to another party. This capability is especially helpful to locate products 26 subject to recall notifications, for example.

After delivery of the product 26, the device 10 provides the required information on the display 18 to meet the regulatory requirements at the destination for the product 26. Further, when a product 26 is the field and a component is replaced, as opposed to the manual tracking of serial numbers to document the change to the component part of the product 26, the device 10 can either be electronically supplied with the updated information via wired or wireless connection to store the updated information in the memory unit 40 for presentation on the display 18. Alternatively, the device 10 can be configured to automatically detect when new components are installed on or within the product 26, such as by use of the transceiver 44 and/or LAN connection 46 to communicate with similar device(s) 10 on the new component(s), and can update the product history record or information stored within the memory unit 44. This updating feature can also be applied to the device 10 when label regulations change for a particular location in which a product 26 is located. Instead of having to physically remove and/or replace the label, the device 10 can be supplied with the updated information according to the changed regulations which can then be supplied for presentation on the display 18.

Further, the device 10 includes the capability to obtain and provide real time data/feedback on product performance and environmental conditions. For example, if the sulfur dioxide levels around the product 26 exceed the design limits, we can alert the customer that damage may happen to the device 26. With this remote tracking/sensing capability from the device 10, better feedback on the product 26 can be supplied for use on future product designs, future repairs to the product 26 can be made proactively in response to data from the device 10, and assistance can be provided to the customers regarding product usage data, uptime monitoring and service alerts.

In another exemplary and non-limiting embodiment, the display 18 can be configured to present data obtained by the sensor suite 42 and/or other components of the device 10 in addition to the product information provided on prior art labels. This enables an on-site individual to access the information stored in the memory unit 40 in a suitable manner for presentation on the display 18.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A product information display device for application to a product, the product information display device comprising:
    a controller;
    a non-transitory electronic memory unit operably connected to, the controller and configured to store product information therein;
    a securing mechanism configured to secure the device to a surface of the product; and
    a display operably connected to the controller and configured to present the product Information thereon wherein the controller includes a transceiver, and wherein the memory unit retains and stores updated product information from the transceiver on newly installed components on the product for presentation on the label,
    wherein the controller includes at least one sensor, and
    wherein the display device is further configured to obtain and provide real-time usage and performance data of the product and environmental condition data of the product from the at least one sensor on the display.

2. The product information display device of claim 1 wherein the transceiver is configured to receive global positing information.

3. The product information display device of claim 1 wherein the at least one sensor is selected from the group consisting of a temperature sensor, a humidity sensor, a vibration sensor, an air quality sensor.

4. The product information display device of claim 3 wherein the air quality sensor is a sulfur dioxide sensor.

5. The product information display device of claim 1 wherein the controller includes a power source.

6. The product information display device of claim 1 wherein the securing mechanism is configured to fixedly secure the device to the product.

7. The product information display device of claim 6 wherein the securing mechanism is a first adhesive layer.

8. The product information display device of claim 7 further comprising a panel including a front surface on which the display is positioned and a rear surface on which the first adhesive layer is positioned.

9. The product information display device of claim 8 further comprising a wired connection between the controller and the display.

10. The product information display device of claim 9 further comprising a second adhesive layer on the controller.

11. The product information display device of claim 8 wherein the panel is formed of a flexible material.

12. The product information display device of claim 1 further comprising printed indicia on the display.

13. The product information display device of claim 1, wherein the display is an organic light-emitting diode (OLED) display.

14. The product information display device of claim 1, wherein the display is further configured to provide alerts on the display concerning the real-time usage and performance data of the product.

15. A method for presenting information about a product on the product, the method comprising the steps of:
    securing a product information display device to the product, the product information display device including a controller, a non-transitory electronic memory unit operably connected to the controller and configured to store product information therein and a display operably connected to the controller and configured to present the product information thereon;
    obtaining product information including real-time usage and performance and environmental condition data of the product; and
    presenting the product information on the display, wherein the controller further includes a transceiver, and wherein the step of obtaining the product information comprises storing the product information within the memory unit and wirelessly detecting and storing updated product information concerning installation of new components on the product.

16. The method of claim 15 further comprising the step of wirelessly transmitting the product information to a remote location.

17. The method of claim 15 wherein the controller further includes at least one sensor, and wherein the step of obtaining the product information comprises receiving sensor information on environmental conditions for the product.

18. The method of claim 15 wherein product information display device includes a panel having a front surface on which the display is positioned and a rear surface on which a first adhesive layer is positioned, and wherein the step of securing the product information display device to the product comprises engaging the first adhesive layer with the product.

19. A product information display device for application to a product, the product information display device comprising:
    a controller;
    a non-transitory electronic memory unit operably connected to the controller and configured to store product information therein;
    a securing mechanism configured to secure the device to a surface of the product; and
    a flexible organic light-emitting diode (OLED) display operably connected to the controller and configured to present the product information thereon wherein the controller includes a transceiver, and wherein the memory unit retains and stores updated product information from the transceiver on newly installed components on the product and real-time usage and performance and environmental condition data of the product for presentation on the display.

* * * * *